Feb. 6, 1923. 1,444,057

M. W. BOSLEY.
GRIP CONDUIT FOR ELECTRIC CONDUCTORS.
FILED JAN. 20, 1921.

Milton W. Bosley,
Inventor,
By Henry F. Brewington,
Attorney.

Patented Feb. 6, 1923.

1,444,057

UNITED STATES PATENT OFFICE.

MILTON W. BOSLEY, OF BALTIMORE, MARYLAND.

GRIP CONDUIT FOR ELECTRIC CONDUCTORS.

Application filed January 20, 1921. Serial No. 438,591.

*To all whom it may concern:*

Be it known that I, MILTON W. BOSLEY, a citizen of the United States, residing at Baltimore city, State of Maryland, have invented certain new and useful Improvements in Grip Conduits for Electric Conductors, of which the following is a specification.

The invention relates to conduits employed for housing and supporting electric conductors in buildings, and more particularly to conduits of the kind consisting of wooden moldings having grooves to seat the conductors and provided with cover plates to retain the latter.

The invention has for its object to provide in a molding of the kind stated a novel and improved means for holding the conductors firmly seated in the grooves so that they are not apt to drop out of the same even if the cover plate should get loose or become detached.

The object stated is attained by forming the side walls of the grooves with retaining beads by which the width of the grooves is reduced at the mouth thereof to such an extent that the conductors cannot drop out, and a further object of the invention is to form these retaining beads in a manner and by a means which are simple and inexpensive.

Figure 1:
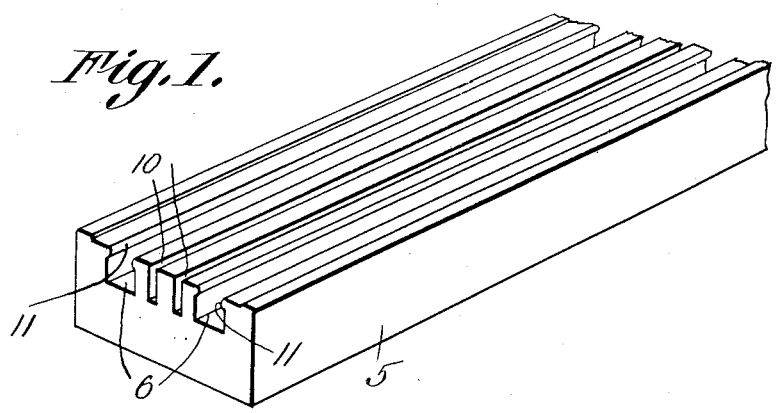
Figure 2:
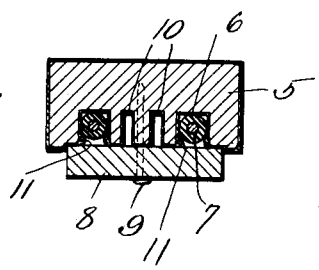
Figure 3:
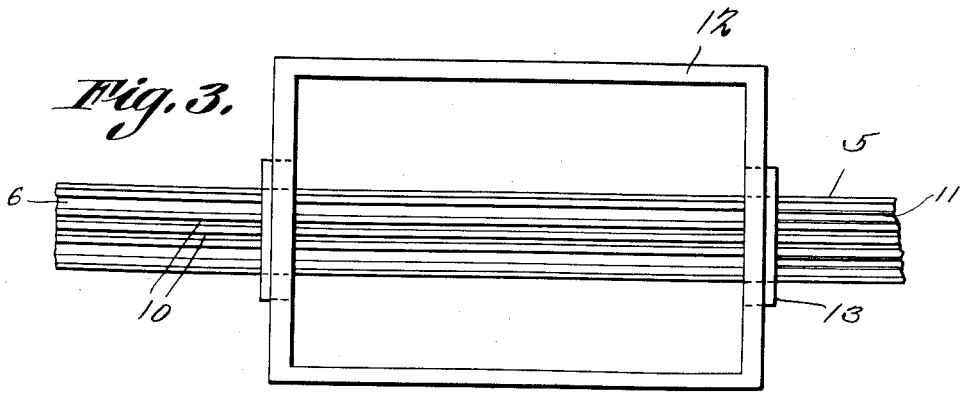
Figure 4:
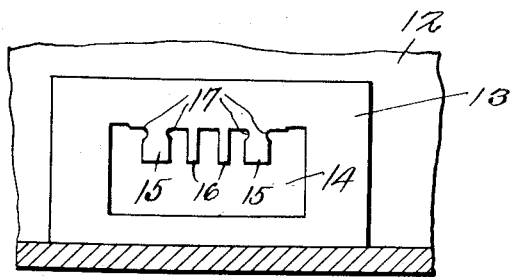

In order that the invention may be better understood, reference is had to the accompanying drawing forming a part of this specification, and in said drawing, Figure 1 is a perspective view of a molding section constructed in accordance with the present invention; Fig. 2 is a cross-section of the molding with the cover plate in place thereon; Fig. 3 is a plan view of the apparatus employed for forming the retaining beads, and Fig. 4 is a cross-section on the line 4—4 of Fig. 3.

Referring specifically to the drawing, 5 denotes a section of the molding, the same being shown provided with two longitudinal grooves 6 in one of its faces in which the conductors 7 seat as shown in Fig. 2, and in which they are retained by a cover plate 8 secured to the grooved face of the molding by nails or other fastening means 9. The grooved face of the molding also has two parallel narrow grooves 10 running parallel to the grooves 6, and designed to render the inner walls of the latter slightly resilient so that they may be sprung to permit insertion of the conductors 7. It is a common practice to make the grooves 6 undercut so that they may retain the conductors, in view of which it is necessary to provide the aforementioned resilient walls in order that the conductors may be inserted.

The production of undercut grooves in the molding render the same expensive in view of the difficulty experienced in making the grooves, and hence the present invention has been devised. The invention consists in forming beads 11 along the side walls of the grooves 6 at the mouth thereof, whereby the grooves are here contracted or reduced in width to such an extent that their width is less than the diameter of the conductors 7, and hence the latter cannot drop out after being forced into the grooves past the beads. This is clearly shown in Fig. 2. The thin resilient inner walls of the grooves yield and allow the conductors to be readily seated in the grooves as described.

In order that the beads 11 may be easily and cheaply produced, they are formed of a plastic coating material such as is commonly used for coating picture moldings. A heavy mass of this coating material is deposited on the walls of the grooves where the beads are to be located, and allowed to dry and harden, and this is all that is necessary to form the beads.

Figs. 3 and 4 illustrate the method and the apparatus for forming the beads 11. The coating material, in a liquid form, is placed in a receptacle 12 having its opposite end walls provided with openings. The molding to be coated is inserted into the receptacle through one of the end openings and it leaves the receptacle through the other end opening. In its passage through the coating material, the molding is covered with the latter.

In order that a heavy deposit of coating material may take place on the walls of the grooves 6 where the beads 11 are to be formed, there is set into each end wall of the receptacle 12 a mold plate 13 having an opening 14 corresponding in shape to the cross-sectional contour of the molding 5. At the top of this opening are depending tongues 15 conforming to the grooves 6, and tongues 16 conforming to the grooves 10. It will be noted in Fig. 4 that at the junction of the tongues 15 with the top edge of the opening 14, the side edges of said grooves have small inwardly extending recesses 17. The openings 14 are of such area that the molding 5 can pass freely therethrough, and the recesses 17 permit a heavy deposit of coating material to form the beads 11.

By the hereinbefore described method the beads 11 can be easily and cheaply produced, and a molding formed with the same possesses all the advantages of a molding having undercut grooves.

I claim;

1. An electric conductor molding having a groove to seat the conductor, and a plastic coating material applied to the side walls of the groove at the mouth thereof to form a bead extending in the direction of the length of the groove, said bead reducing the width of the groove at the mouth thereof to a distance which is less than the diameter of the conductor.

2. An electric conductor molding having a groove to seat the conductor, and a plastic coating, said coating having a thickness on the side wall of the groove at the mouth thereof to form a bead running in the direction of the length of the groove.

In testimony whereof I affix my signature

MILTON W. BOSLEY.